United States Patent [19]

Harris, Jr.

[11] 4,355,237
[45] Oct. 19, 1982

[54] HIGH SPEED AC/DC COUPLER
[75] Inventor: William S. Harris, Jr., Austin, Tex.
[73] Assignee: Texas Instruments Incorporated, Dallas, Tex.
[21] Appl. No.: 174,973
[22] Filed: Aug. 4, 1980
[51] Int. Cl.³ .............................................. G02B 27/00
[52] U.S. Cl. ..................................... 250/551; 307/311
[58] Field of Search ................... 250/214 R, 551, 210, 250/214 DC; 307/311; 357/19; 455/601, 600, 602

[56] References Cited
U.S. PATENT DOCUMENTS

| | | | |
|---|---|---|---|
| 3,995,173 | 11/1976 | Sibley | 307/311 |
| 4,138,635 | 2/1979 | Quinn | 307/311 |
| 4,282,604 | 8/1981 | Jefferson | 455/602 |
| 4,292,628 | 9/1981 | Sadler | 250/551 |

Primary Examiner—David C. Nelms
Attorney, Agent, or Firm—Melvin Sharp; N. Rhys Merrett; Thomas G. Devine

[57] ABSTRACT

A high speed AC/DC coupler has an optical circuit for DC coupling and an AC coupler circuit, both receiving a digital input signal and both providing outputs resulting from the input signal to the same point of a clipper circuit. The response characteristic of the AC coupler circuit is faster than that of the optical coupler circuit and the output impedance of the optical coupler circuit is of such a magnitude to permit the output of the AC coupler to overdrive the output of the optical coupler. The time constant of the AC coupler circuit is set so that the signal from the AC coupler is impressed on the clipper circuit and remains impressed at least until the slower optical coupler output is also applied to the clipper circuit. The circuit provides a faithful reproduction of essentially any length input pulse, delayed a minimal time.

8 Claims, 2 Drawing Figures

HIGH SPEED AC/DC COUPLER

BACKGROUND OF THE INVENTION

1. Field of the Invention

This invention relates to optical couplers and more specifically to an optical coupler provided with an AC speed up circuit.

2. Description of the Prior Art

In the past, to couple a digital signal from one part of a system to another while maintaining electrical isolation between the two, capacitors and pulse transformers have been employed. They share the common disadvantage of having a high-pass filter characteristic and thus are unable to pass DC signals.

In more recent designs, optical coupling is often used. Optical coupling employs integrated opto couplers having input light emitting diodes optically coupled to output photo transistors. Such opto couplers pass DC signals with a high degree of electrical isolation but they have a severe limitation in their operational speed.

Many approaches have been attempted to decrease the response time of such opto couplers. One approach involves using an integrated output amplifier which reduces the propagation time to the order of 45 nanoseconds. Another approach is to use a circuit design which in some manner reduces the photo transistor's effective output capacitance (or the effect of the output capacitance) thus increasing the speed of the coupling. However, the response time is in the order of 100 nanoseconds.

The present invention provides the advantages of the DC opto coupler characteristic with the speed of AC coupling thus providing a response time that is substantially lower than that of the above circuits.

BRIEF SUMMARY OF THE INVENTION

An opto coupler having a light emitting diode (LED), activated by an input digital signal, and a photo transistor activated by the light emitted from the LED provides electrical isolation and DC coupling. Essentially in parallel with the opto coupler is an AC coupling circuit connected to receive the digital input signal and to respond quickly to it. The output of the opto coupler and the AC coupling circuit are connected to the same point in a receiver circuit. In this preferred embodiment, the receiver circuit is a clipper circuit. In this preferred embodiment, capacitive coupling is used for the AC circuit with the time constant being set to a value to permit activation of the clipper circuit by the output of the AC coupler circuit and maintenance of such input signal until the output of the optocoupler is also applied. When the input signal changes state, that change is immediately coupled through the AC coupling circuit to the clipper circuit overriding the output from the opto coupler circuit and shutting off the clipper circuit. In this manner, an input signal of any period is faithfully reproduced, delayed, in this preferred embodiment, in the order of 10 nanoseconds.

In an alternative embodiment, a pulse transformer may be used for the AC coupling circuit. The primary winding of the transformer receives the digital input signal and the secondary winding of the transformer is connected to the clipper circuit, in parallel with the photo transistor. The response time of the transformer is much faster than that of the opto coupler and its inductive resistance is selected to maintain its input signal to the clipper circuit until the opto coupler output is also present.

The principle object of the this invention is to provide in essence, a very high speed opto coupler circuit.

Another object of this invention is to provide an optical coupler circuit having an AC coupler circuit in parallel to provide very fast transfer of the AC component of an input digital signal to a receiver circuit, followed by the DC component from the opto coupler.

These and other objects will be made evident in the detailed description that follows.

DETAILED DESCRIPTION OF THE INVENTION

Figure 1:
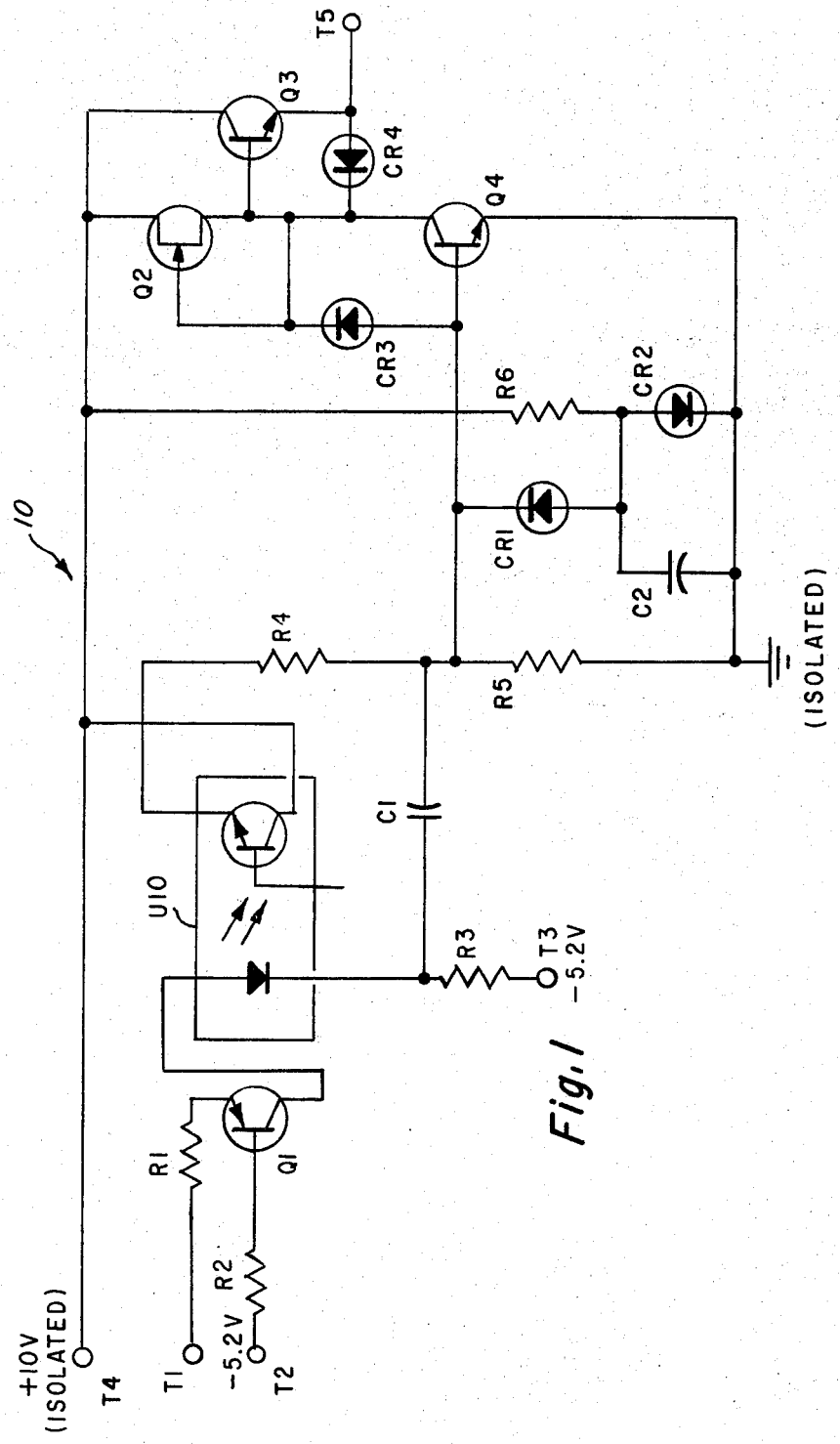
FIG. 1 is a schematic diagram of the AC/DC coupler of this invention utilizing capacitive coupling for the AC coupling circuit.

Referring to FIG. 1, terminal T1 upon which an input signal is impressed, is shown connected through resistor R1 to the emitter of transistor Q1 whose base is biased through resistor R2 at terminal T2 by −5.2 volts. The collector of transistor Q1 is connected to the anode of the LED of opto coupler U10. In this preferred embodiment, coupler U10 is a Texas Instruments Incorporated type TIL111 opto-coupler described in detail beginning at page 119 of the Texas Instruments "Opto Electronics Data Book for Design Engineers", copyright 1976. The cathode of the LED of opto coupler U10 is connected through resistor R3 to terminal T3 upon which −5.2 volts is impressed. The base of the photo transistor of opto coupler U10 is open and the collector is connected to terminal T4 upon which an isolated +10 volts is applied.

The cathode of the LED is also connected to one side of capacitor C1 whose other side is connected to the emitter of the phote transistor of opto coupler U10 through resistor R4. The other side of capacitor C1 is also connected through resistor R5 to isolated ground and to the base of transistor Q4. The cathode of diode CR1 is connected to the base of transistor Q4 as is the anode of diode CR3. The cathode of diode CR3 is connected to the collector of transistor Q4 and to the gate of transistor Q2 whose drain is connected to terminal T4 and whose source is connected to the collector of transistor Q4.

The anode of diode CR1 is connected to one side of capacitor C2 whose other side is connected to ground. The anode of diode CR1 is also connected to the anode of diode CR2 whose cathode is connected to ground. The anode of diode CR2 is also connected through resistor R6 to terminal T4. The emitter of transistor Q4 is connected to ground.

The base of transistor Q3 is connected to the collector of transistor Q4 and its collector is connected to terminal T4. The cathode of diode CR4 is also connected to the collector of transistor Q4 and its anode is connected to the emitter of transistor Q3, providing the output for the circuit on terminal T5.

Figure 2:
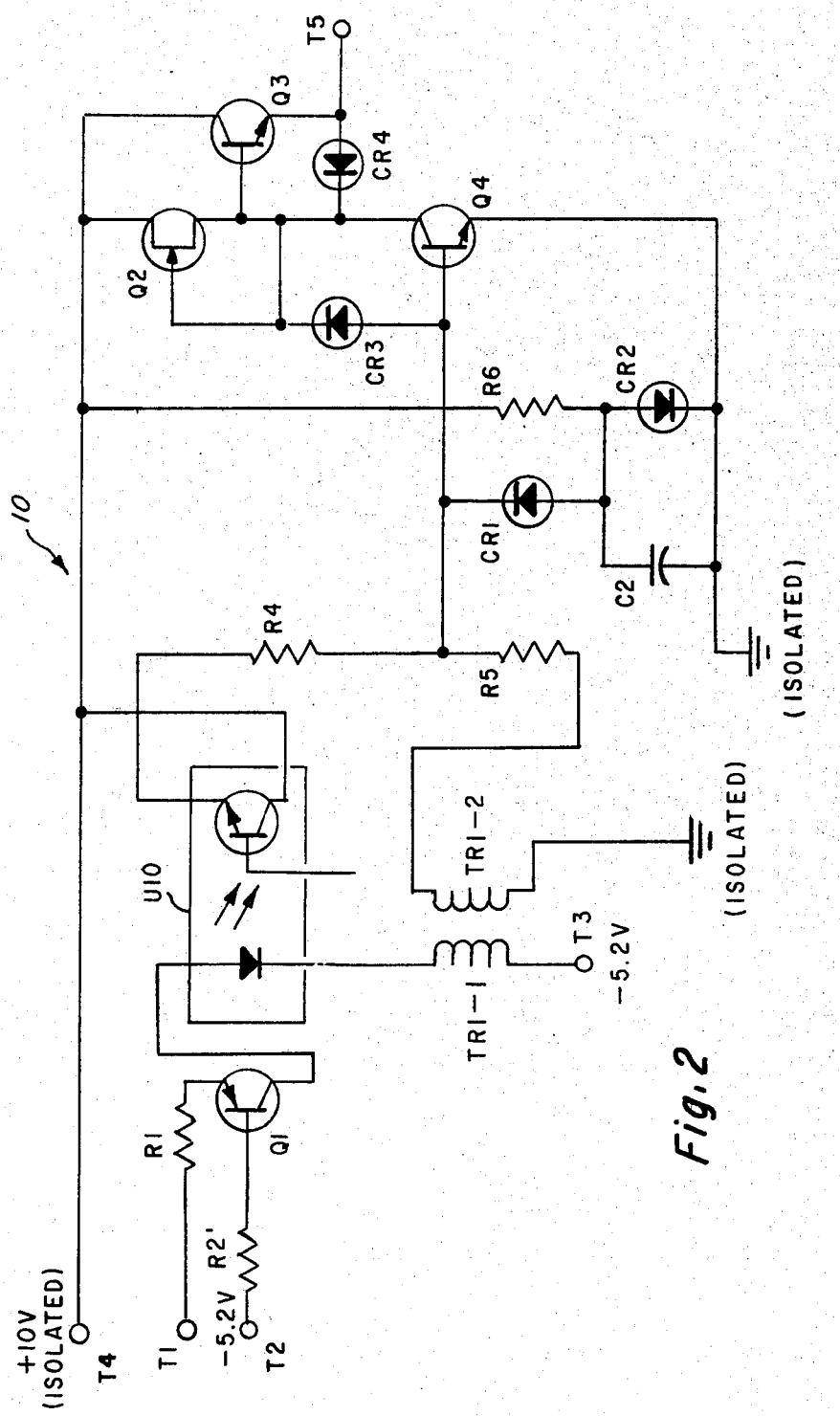
FIG. 2 is a schematic diagram of the AC/DC coupler of this invention wherein a pulse transformer is used for the AC coupling circuit.

Referring now to FIG. 2, a second embodiment of the invention is illustrated. The designators remain the same except where appropriate prime notations are used. The only difference in the schematic of FIG. 2 is that transformer TR1 is substituted for capacitor C1 and resistor R3. That is, the cathode of the LED is connected through the primary winding TR1-1 of transformer TR1 to terminal T3 upon which a −5.2 volts is impressed. One end of the secondary winding TR1-2 of transformer TR1 is grounded and the other end is connected through resistor R5' to the base of the clipper transistor Q4.

MODE OF OPERATION

Referring to FIG. 1, a digital signal is applied to input terminal T1 through resistor R1 to the emitter of transistor Q1, turning that transistor on. When transistor Q1 is turned on, the LED of opto coupler U10 conducts impressing a voltage across resistor R3, representing the input signal. It should be noted that the collector of amplifier transistor Q1 may also be connected directly to coupling capacitor C1. In such a connection, the current requirement from amplifier Q1 is higher than in the implementation of FIG. 1 where only the LED of opto coupler U10 requires an input.

The signal developed across resistor R3 is effectively transmitted via coupling capacitor C1 to the base of clipper transistor Q4. Transistor Q4 is turned on by a positive signal applied to its base. Capacitor C1 discharges through the base of Q4 and this RC time constant is such that a positive voltage is maintained on the base of Q4 sufficient to keep transistor Q4 conducting at least until the photo transistor of opto coupler U10 conducts providing a positive voltage to the base of Q4. The discharge path for capacitor C1 is through isolated ground which is electrically connected to the −5.2 V supply through a low impedance source.

When the input digital signal applied to terminal T1 goes negative, this signal is transmitted via coupling capacitor C1 to the base of transistor Q4, overriding the positive voltage applied from opto coupler U10. Clipper transistor Q4 is therefore cut off. The value of resistor R4 is made high enough so that opto coupler U10 is easily overridden by the signal from coupling capacitor C1.

The current path between +10 volts, isolated and isolated ground made up of resistor R6 and diode CR2, in series, provides a reference voltage of one diode drop above isolated ground for Schottky diode CR1. Therefore, when transistor Q4 has just been turned off, any negative potential remaining on the base will turn on diode CR1 so that the base of transistor Q4 is held just above the isolated ground potential.

Schottky diode CR3 enhances the speed of switching of transistor Q4, being connected between the collector and base. The combination of field effect transistor Q2, transistor Q3 and diode CR4, in combination with the clipper transistor Q4, forms a push pull output circuit. When transistor Q4 is turned off, transistor Q3 receives base current from FET transistor Q2, turning transistor Q3 on. When transistor Q3 is turned on, essentially +10 volts is present at terminal T5. When transistor Q4 is turned on, then the base drive to transistor Q3 is lowered and transistor Q3 is turned off. With transistor Q3 turned off, the voltage present at terminal T5 is essentially at ground. Diode CR4 is present to provide a current path from terminal T5 to the collector of clipper transistor Q4. Diode CR4 also provides a protection function for transistor Q3 to prevent excessive back biasing between its emitter and base.

With respect to FIG. 2, the operation is exactly the same as described for FIG. 1, except of course, there is no coupling capacitor. There is a pulse transformer to provide the AC coupling. The input digital signal, amplified through amplifier Q1', transmitted through the LED of opto coupler U10 is sent through the primary winding TR-1 of pulse transformer TR1. A voltage is induced in the secondary winding TR1-2 which then is impressed on the base of clipper transistor Q4.

In summary, a very high speed opto coupler circuit is provided. Those skilled in the art are aware that components may be substituted and circuits altered without departing from the scope of this invention.

What is claimed is:
1. A high speed AC/DC coupler comprising:
    (a) input circuit means for receiving an electrical input signal;
    (b) optical coupler circuit means electrically connected to the input circuit means for receiving the electrical input signals;
    (c) AC coupling circuit means electrically connected to receive the input signal; and
    (d) receiver circuit means electrically connected to receive the signal from the AC coupling circuit means and the signal from the optical coupler circuit means to provide an output signal.
2. The coupler of claim 1 wherein the optical coupler circuit means comprises:
    (b) (ii) a light emitter for emitting light upon being activated by the input signal; and
    (ii) a photo sensitive receiver for generating an electrical signal output upon being activated by the light emitted from the light emitter.
3. The coupler of claim 2 wherein the light emitter comprises a light emitting diode and the photo sensitive receiver comprises a photo transistor.
4. The coupler of claim 1 wherein the AC coupling circuit means comprises a capacitor differentiating circuit.
5. The coupler of claim 3 wherein the AC coupling circuit means comprises a capacitor differentiating circuit having a faster response characteristic than the optical coupler circuit means.
6. The coupler of claim 1 wherein the AC coupling circuit means comprises a pulse transformer.
7. A coupler of claim 3 wherein the AC coupling circuit means comprises a pulse transformer having a faster response characteristic than the optical coupler circuit means.
8. The coupler of claims 1, 5 or 7 wherein the receiving circuit means comprises a clipper circuit having an input impedance selected to permit the signal from the AC coupling circuit means to over drive the signal from the optical coupler circuit.

* * * * *